(12) United States Patent  (10) Patent No.: US 7,735,082 B2
Egashira et al.  (45) Date of Patent: Jun. 8, 2010

(54) TASK MANAGEMENT SYSTEM

(75) Inventors: Toru Egashira, Yokohama (JP); Yu Inamura, Kawasaki (JP); Atsushi Takeshita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1376 days.

(21) Appl. No.: 11/171,281

(22) Filed: Jul. 1, 2005

(65) Prior Publication Data

US 2006/0010447 A1   Jan. 12, 2006

(30) Foreign Application Priority Data

Jul. 2, 2004   (JP)   ............................. 2004-197150

(51) Int. Cl.
   G06F 9/46   (2006.01)
   G06F 9/26   (2006.01)
   H04L 29/06   (2006.01)
(52) U.S. Cl. ..................... 718/100; 711/200; 713/154
(58) Field of Classification Search ......... 718/100–103, 718/108; 713/154; 711/200
   See application file for complete search history.

(56) References Cited

U.S. PATENT DOCUMENTS

2003/0037091 A1*   2/2003   Nishimura et al. .......... 709/103

FOREIGN PATENT DOCUMENTS

| JP | 2000-66904 | 3/2000 |
| JP | 2003-140971 | 5/2003 |
| JP | 2004-38272 | 2/2004 |

OTHER PUBLICATIONS

AEGIS: Architecture for Tamper-Evident and Tamper Resistant Processing G. Suh, D. Clarke, B. Gassend, M. Dijk, S. Devades Labatory of Computer Science Massachuesetts Institute of Technology Jun. 2003, pp. 160-171.*
Edward Suh, et al. "AEGIS: Architecture for Tamper-Evident and Tamper-Resistant Processing" CSAIL, Computer Science and Artificial Intelligence Laboratory, Massachusetts Institute of Technology, Submission to the Proceedings of the 17th International Conference on Supercomputing, Computation Structures Group, Memo 461, XP-002470171, Feb. 2003, pp. 1-16, 1 Cover Page, and 1 Annex Page.

* cited by examiner

*Primary Examiner*—Meng-Ai An
*Assistant Examiner*—Douglas Bryant
(74) *Attorney, Agent, or Firm*—Oblon, Spivak, McClelland, Maier & Neustadt, L.L.P.

(57) ABSTRACT

A task management system in an operating system executes a plurality of tasks in parallel. The task management system includes an execution standby state changer configured to generate a verifier of a task from data stored in a task address space and to store the generated verifier in a verifier storage area, when the task is changed from an executed state to an execution standby state; and an executed state changer configured to generate a verifier of the task from the data stored in the task address space and to verify matching of the generated verifier with the verifier of the task stored in the verifier storage area, when the task is changed from the execution standby state to the executed state.

10 Claims, 11 Drawing Sheets

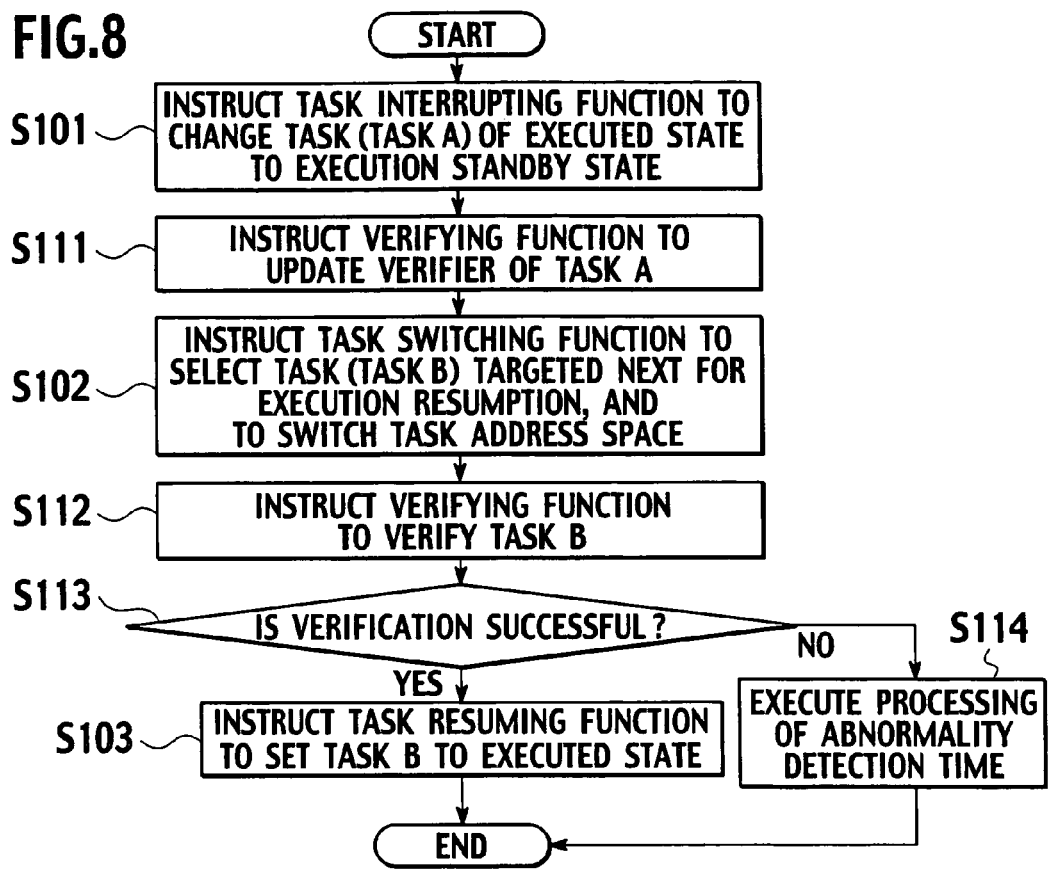
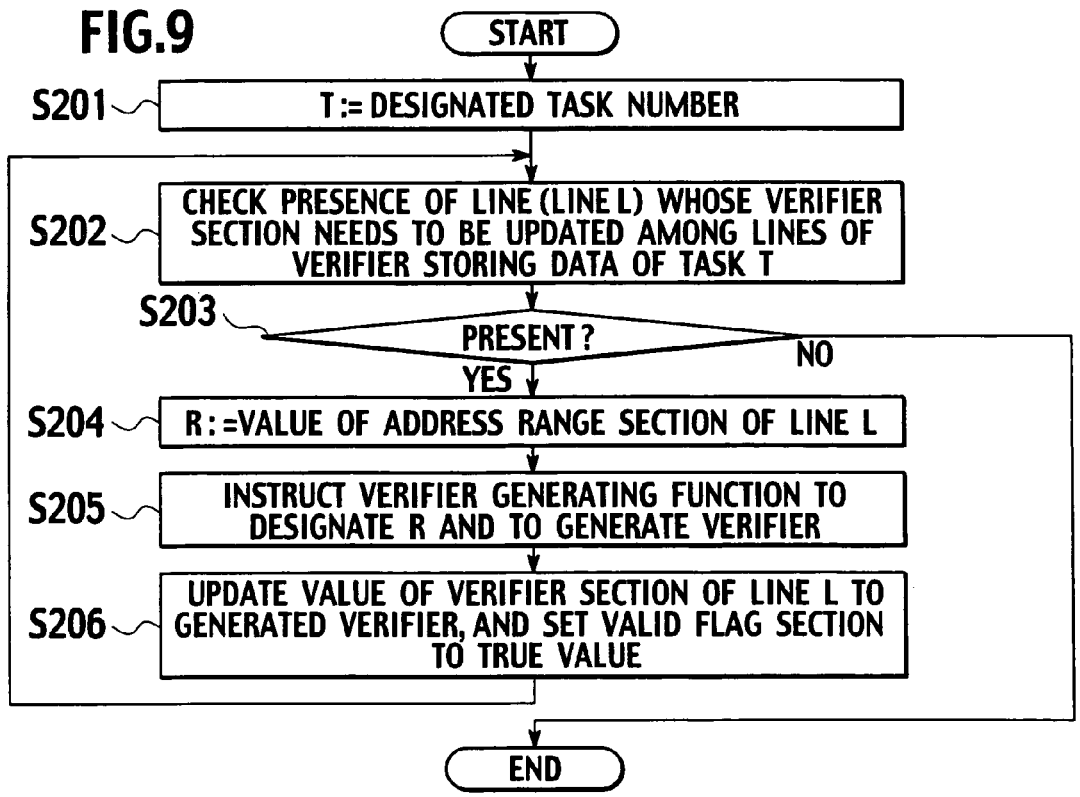

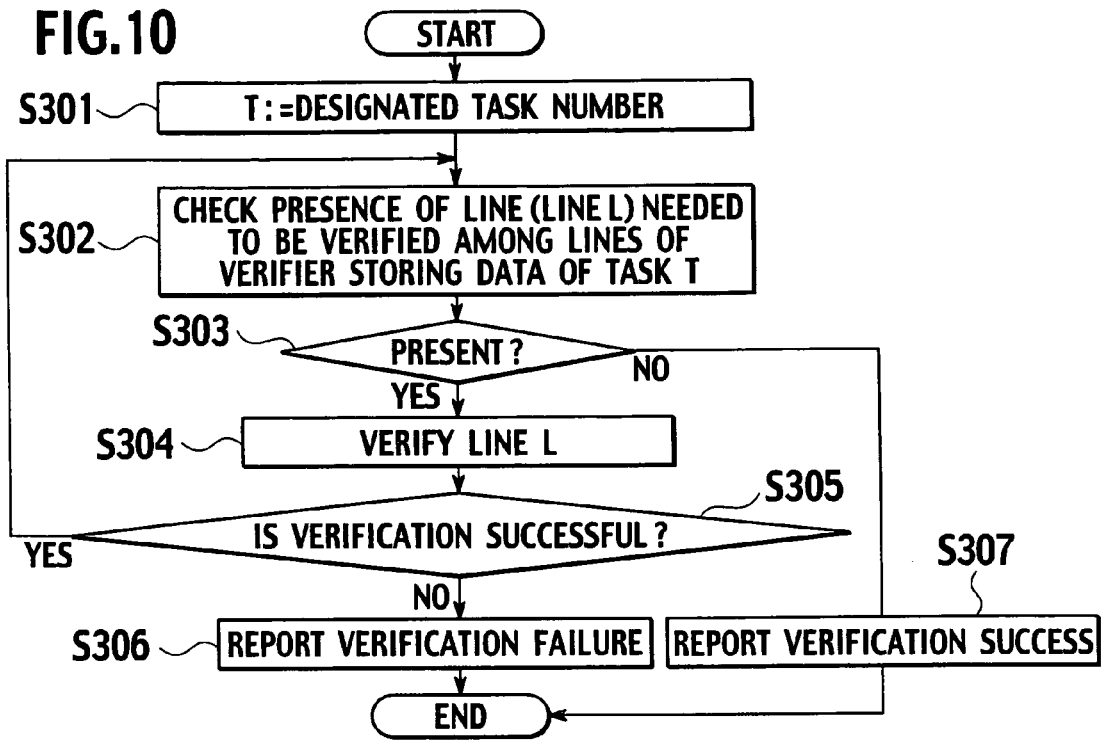
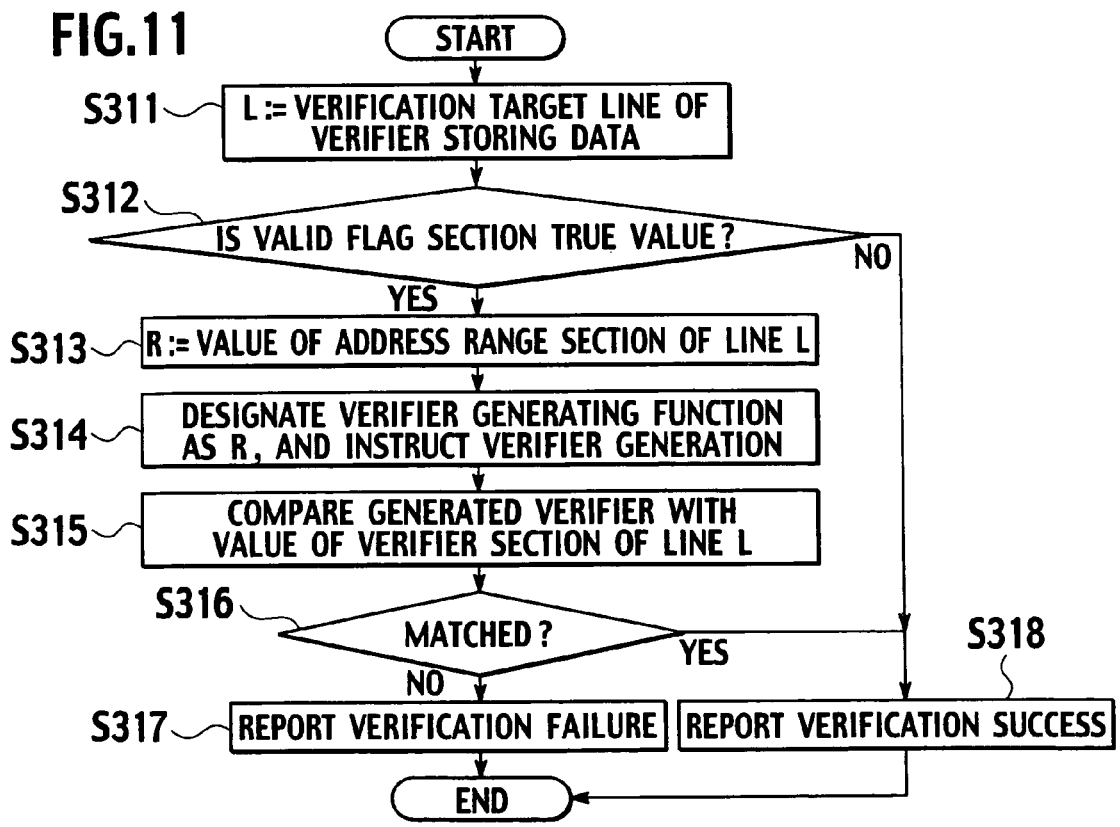

TASK MANAGEMENT SYSTEM

CROSS REFERENCE TO RELATED APPLICATION

This application is based upon and claims the benefit of priority from the prior Japanese Patent Application No. P2004-197150, filed on Jul. 2, 2004; the entire contents of which are incorporated herein by reference.

BACKGROUND OF THE INVENTION

1. Field of the Invention

The present invention relates to a task management system in an operation system for executing a plurality of tasks in parallel.

2. Description of the Related Art

There has conventionally been known a task management system which achieves switching of tasks when a plurality of tasks are executed on an electronic computer by switching at a high speed to realize parallel processing. The task management system is a subsystem of an operating system of the electronic computer.

Referring to FIGS. 1 to 5, the related task management system will be described. FIG. 1 is a block diagram showing a configuration of a related task management system 100.

As shown in FIG. 1, the related task management system 100 includes a task management unit 110, and a storage unit 120.

The task management unit 110 includes a management function 111, a task interrupting function 112, a task resuming function 113, and a task switching function 114.

The management function 111 is configured to control executions of the task interrupting function 112, the task resuming function 113, and the task switching function 114.

The task interrupting function 112 is configured to change a task of an executed state to an execution standby state.

The task resuming function 113 is configured to change the task of an execution standby state to an executed state.

The task switching function 114 is configured to select a task whose execution is resumed, and to switch a task address space.

The storage unit 120 includes a task information storage area 121, and a plurality of task address spaces 122-1 to 122-n.

The task information storage area 121 is an area for storing to associate a task number to identify each task with task information to indicate a state of each task.

The task information contain contents of a register of a central processing unit (CPU), data necessary for resuming execution of the task, such as am identification of a task address space used by the task, and management data on a priority of the task, total execution time or the like.

The task address spaces 122-1 to 122-n are for managing task address spaces which are address spaces of the tasks. The task address space is a logical address space generally different from one task to another.

In other words, even in the case of the same address, a physical address space to be actually accessed generally varies from one task to another (permitted to be similar).

Hereinafter, an operation of the related task management system will be described.

FIG. 2 is a flowchart illustrating processing when the management function 111 of the related task system 100 performs task switching.

As shown in FIG. 2, in a step S101, when executing task switching, the management function 111 instructs the task interrupting function 112 to change a task of a currently executed state to an execution standby state. The task of the executed state will be referred to as a "task A" hereinafter.

In a step S102, the management function 111 instructs the task switching function 114 to select a task which is a target of next execution resumption, and to switch a task address space. The task selected as the execution resumption target will be referred to as a "task B" hereinafter.

In a step S103, the management function 111 instructs the task resuming function 113 to set the task B to an executed state, and finishes the processing.

FIG. 3 is a flowchart illustrating processing when the task interrupting function 112 of the related task management system 100 performs task switching.

As shown in FIG. 3, in a step S101A, the task interrupting function 112 changes the task (task A) of the currently executed state to an execution standby state according to the instruction from the management function 111 in the step S101.

In a step S102A, the task interrupting function 112 stores task information of the task A in the task information storage area 121.

FIG. 4 is a flowchart illustrating processing when the task switching function 114 of the related task management system 100 performs task switching.

As shown in FIG. 4, in a step S101B, the task switching function 114 refers, according to the instruction from the management function 111 in the (step S102, to the task information storage area 121, considers fairness, a priority or the like among the tasks, and decides a task (task B) which becomes a target of execution resumption among the tasks processed by the task management system 100.

In a step S102B, the task switching function 114 switches a task address space, so as to enable use of a task address space previously used in the executed slate of the task B.

Specifically, the task switching function 114 executes task address space switching by a change in setting of a mechanism of associating logical and physical addresses with each other such as a change in setting of a segment register of the CPU or the page table.

However, in an electronic computer (i.e., system where a physical address is the only address space) which does not use the address associating mechanism, when each divided portion of a physical address space is set as a task address space, setting processing of task address space switching is not necessary.

FIG. 5 is a flowchart illustrating processing when the task resuming function 113 of the related task management system 100 performs task switching.

As shown in FIG. 5, in a step S101C, the task resuming function 113 obtains the task information of the task B from the task information storage area 121 according to the instruction from the management function 111 in the step S103.

The task resuming function 113 sets register contents of the CPU based on the obtained task information in the step S102C, and resumes the execution of the task B in a step S103C.

As examples of the aforementioned related task management system 100, there have been known a system which includes a task switch control function, a task interrupting function and a task resuming function, and a multitask OS such as UNIX (registered trademark).

However, the related task management system has had a problem that even if a change occurs in data stored in the task address space of the task to affect processing of the task in the period of the execution standby state of the task, the change cannot be detected.

Thus, illegal rewriting of important data by other tasks is overlooked without being detected, consequently affecting task processing which uses the data.

BRIEF SUMMARY OF THE INVENTION

The present invention has been made in view of the foregoing problems, and it is an object of the invention to provide a task management system capable of detecting a change to affect processing of a task in data stored in a task address space of the task in a period of an execution standby state of the task.

A first aspect of the present invention is summarized as a task management system in an operating system for executing a plurality of tasks in parallel. The task management system includes an execution standby state changer configured to generate a verifier of a task from data stored in a task address space and to store the generated verifier in a verifier storage area, when the task is changed from an executed state to an execution standby state; and an executed state changer configured to generate a verifier of the task from the data stored in the task address space and to verify matching of the generated verifier with the verifier of the task stored in the verifier storage area, when the task is changed from the execution standby state to the executed state.

In the first aspect, the verifier storage area can be configured to store a record to associate a predetermined address range in the task address space with the verifier of the task; and the execution standby state changer can be configured to update the verifier of the task in a record in which the verifier of the task needs to be updated, and to store the updated verifier in the verifier storage area.

In the first aspect, the verifier storage area can be configured to store a record to associate the predetermined address range, the verifier of the task, and a valid flag with one another; and the execution standby state changer can be configured to judge that a record having a false value set in the valid flag is a record in which the verifier of the task needs to be updated, to update the verifier of the task in the record, and to store the updated verifier in the verifier storage area.

In the first aspect, the execution standby state changer can be configured to judge that a record having the verifier of the task not updated for a predetermined period is a record in which the verifier of the task needs to be updated, to update the verifier of the task of the record, and to store the updated verifier in the verifier storage area.

In the first aspect, the execution standby state changer and the executed state changer can be configured to set, as a verifier of the task, data calculated by inputting the data stored in the task address space to a secure hash function or a reversible encoding function.

In the first aspect, the execution standby state changer and the executed state changer can be configured to set, as a verifier of the task, data calculated by inputting the data stored in the task address space to a reversible encoding function, when the predetermined address range is smaller than a predetermined threshold value, add to set, as a verifier of the task, data calculated by inputting the data stored in the task address space to a secure hash function, when the predetermined address range is larger than the threshold value.

In the first aspect, the task management system further includes an access detector configured to detect access to data stored in the predetermined address range of the specific record.

In the first aspect, the task address space can be managed by a paging system; and a page fault can be generated when the access detector detects access to data stored in a page containing the predetermined address range of the specific record.

In the first aspect, the task management system further includes a verifying unit configured to verify, when the page fault occurs, the verifier of the task in a record containing a predetermined address range near an address in which the page fault has occurred.

BRIEF DESCRIPTION OF THE SEVERAL VIEWS OF THE DRAWINGS

FIG. 8 is a flowchart showing an operation of a management function in the task management system of the first embodiment of the present invention;

FIG. 9 is a flowchart showing an operation of a verifying function in the task management system of the first embodiment of the present invention;

FIG. 10 is a flowchart showing an operation of the verifying function in the task management system of the first embodiment of the present invention;

FIG. 11 is a flowchart showing an operation of the verifying function in the task management system of the first embodiment of the present invention;

DETAILED DESCRIPTION OF THE INVENTION (Configuration of a Task Management System According to First Embodiment of the Invention)

A task management system 200 of a first embodiment of the present invention is a task management system in an operating system for executing a plurality of tasks in parallel. Especially, the task management system 200 of this embodiment is configured to detect a change in data stored in a task address space.

Figure 1:
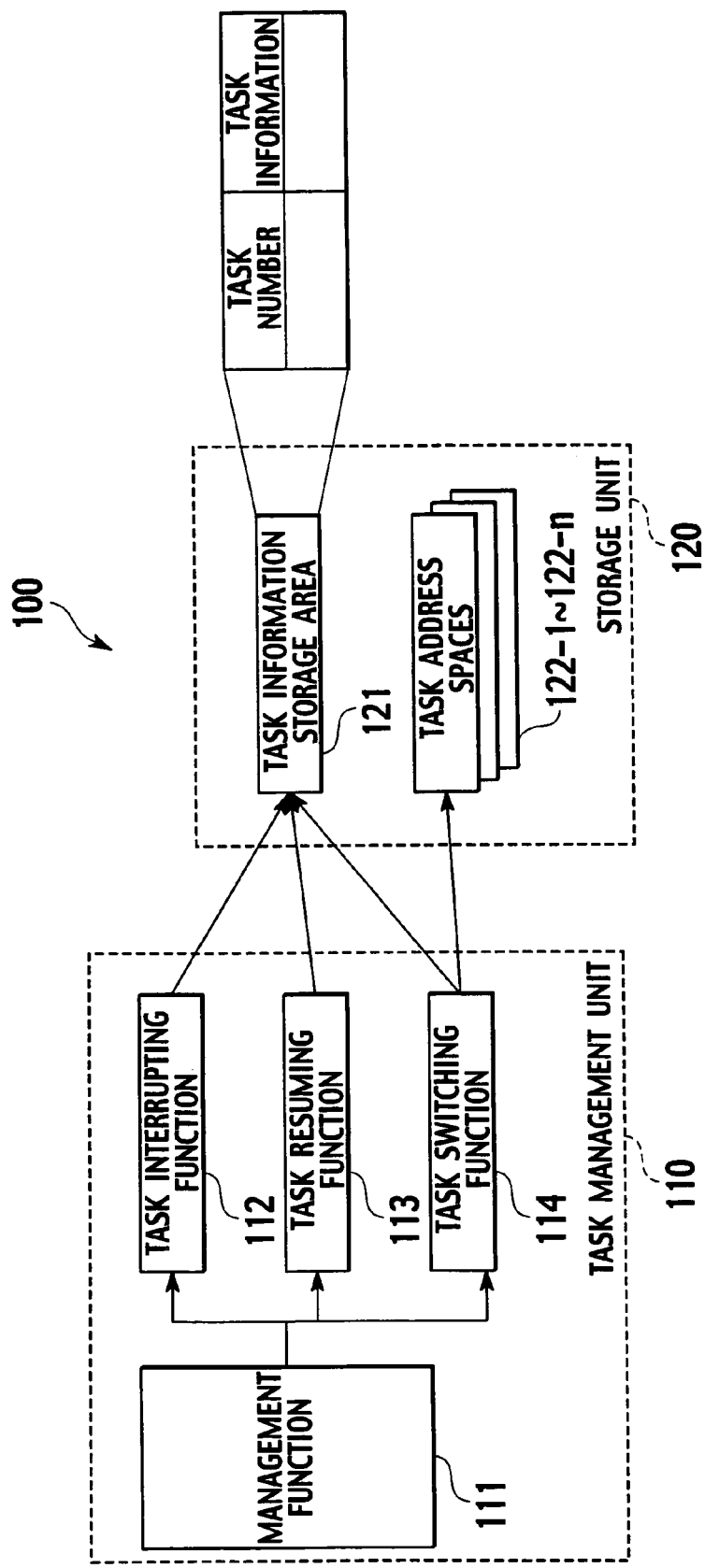
FIG. 1 is a functional block diagram of a task management system according to a related art.
Figure 2:
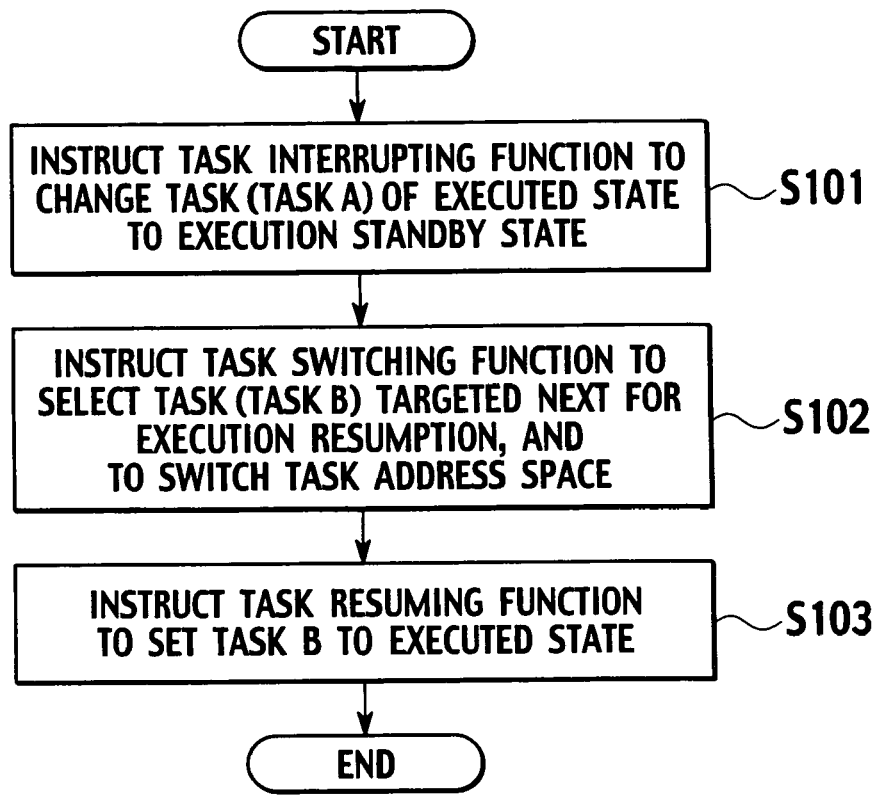
FIG. 2 is a flowchart showing an operation of a management function in the task management system of the related art.
Figure 3:
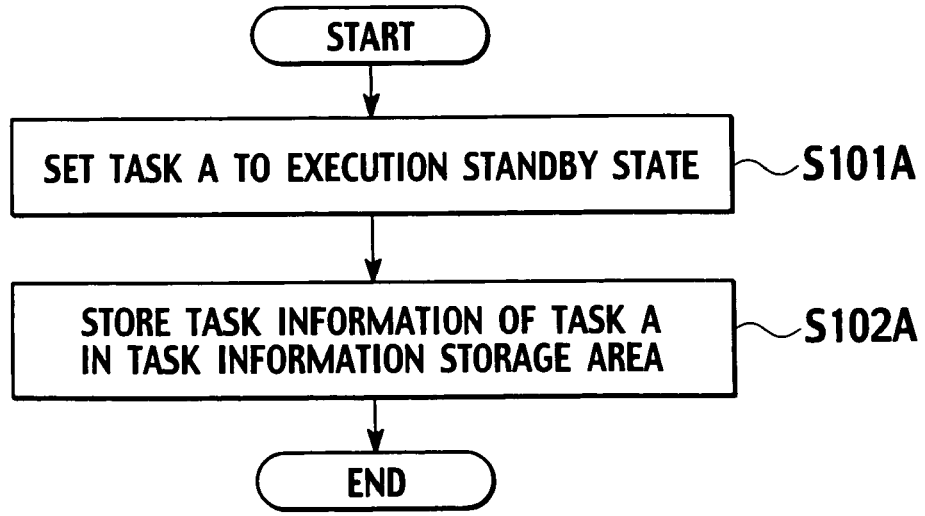
FIG. 3 is a flowchart showing an operation of a task interrupting function in the task management system of the related art.
Figure 4:
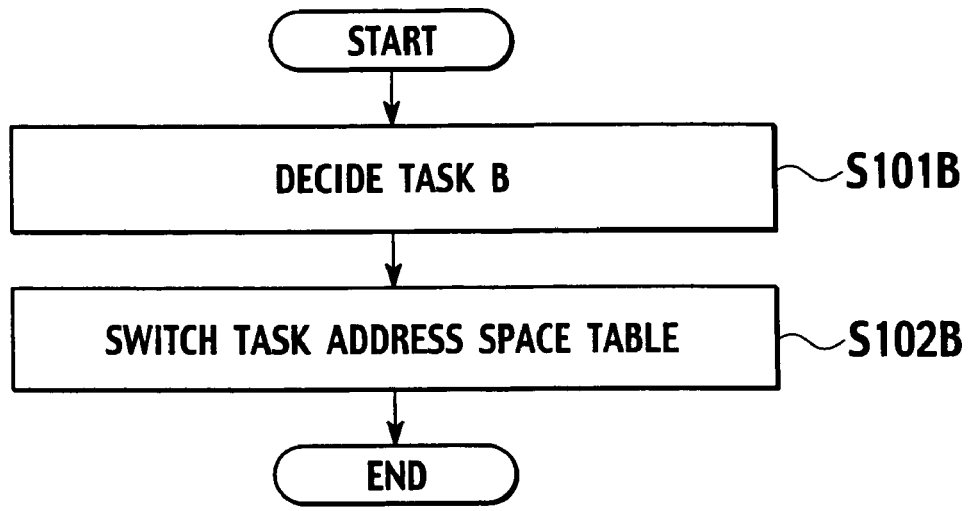
FIG. 4 is a flowchart showing an operation of a task switching function in the task management system of the related art.
Figure 5:
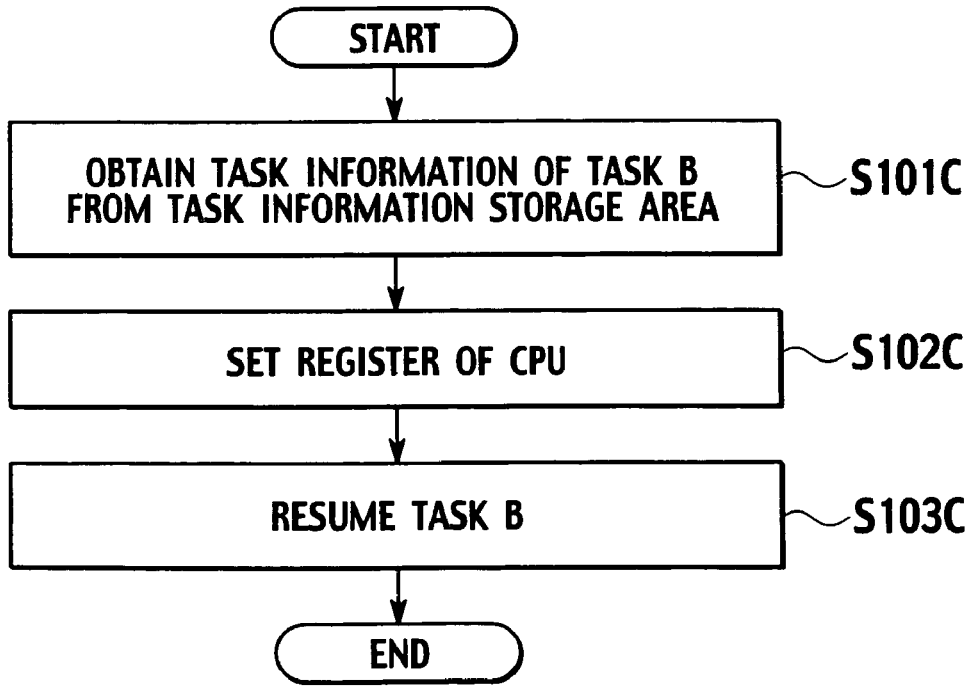
FIG. 5 is a flowchart showing an operation of a task resuming function in the task management system of the related art.
Figure 6:
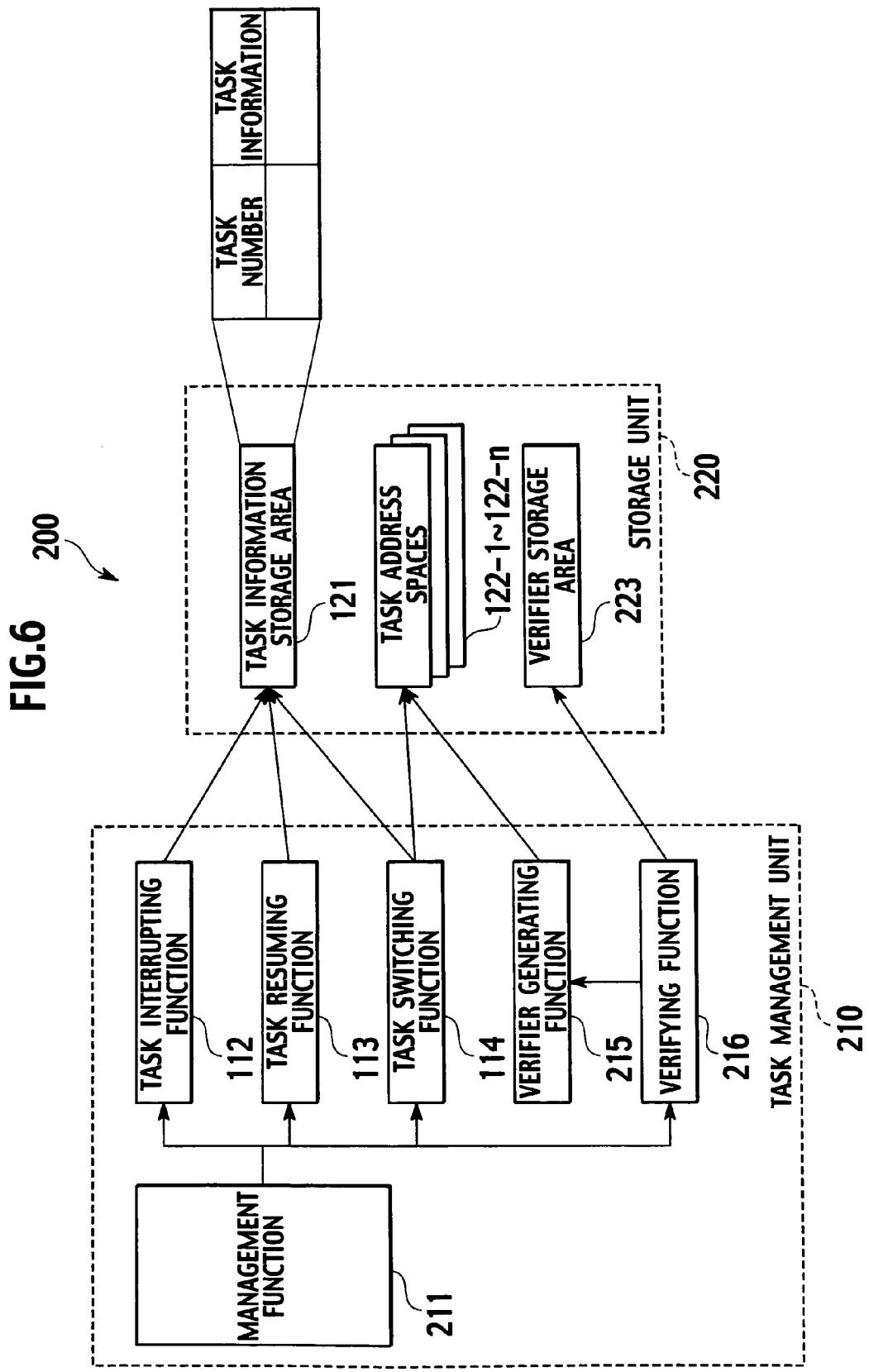
FIG. 6 is a functional block diagram of a task management system according to a first embodiment of the present invention.

Referring to FIG. 6, the task management system 200 of this embodiment includes a task management unit 210 and a storage unit 220.

The task management unit 210 includes a management function 211, a task interrupting function 112, a task resuming function 113, a task switching function 114, a verifier generating function 215, and a verifying function 216.

The task interrupting function 112, the task resuming function 113, and the task switching function 114 are identical to the functions 112 to 114 of the task management system 100 of the related art.

The verifier generating function 215 is configured to generate a verifier of a relevant task from the data stored in the task address space.

Specifically, when the verifying function 216 designates a predetermined address range and instructs generation of a task verifier, the verifier generating function 215 generates a verifier of a relevant task from data stored within the predetermined address range designated in an address space including a current available task address space.

In this case, the task verifier is output data calculated by inputting data stored within the predetermined address range to a predetermined transformation function.

The following characteristics are required for the transformation function.

- The transformation function calculates the same output data for the same input data.
- When output data for arbitrary input data "A" is "B", the transformation function makes it very difficult to find input data "C" whose output data similarly becomes "B" and which is different from the input data "A".

As transformation functions to satisfy such a characteristic, there are available a secure hash function such as a message digest 5 (MD 5) or a secure hash algorithm (SHA), a reversible encoding function (including a transformation function of directly using input data as output data) for reversibly encoding input data, and the like.

The secure hash function outputs data of a length nondependent on an input data length, but a calculation processing function load of the secure hash function is relatively large.

On the other hand, the reversible encoding function is characterized by outputting data of a length dependent on the input data length while a calculation processing load of the reversible encoding function is relatively small.

Thus, when the designated predetermined address range is relatively small (e.g., smaller than a predetermined threshold value), the verifier generating function 215 can employ an output of the reversible encoding function as output data.

In other cases (e.g., larger than the predetermined threshold value), a transformation function that employs an output of the secure hash function as output data can be used.

The verifying function 216 is configured to verify matching between the verifier of the relevant task generated from the data stored in the task address space and a verifier of a relevant task stored in a verifier storage area.

The management function 211 is configured to control executions of the functions 112 to 216.

The storage unit 220 includes a task information storage area 121, a plurality of task address spaces 122-1 to 122-n, and a verifier storage area 223.

The task information storage area 121 and the plurality of task address spaces 122-1 to 122-n are identical to the functions 121 and 122-1 to 122-n of the task management system 100 of the related art.

The verifier storage area 223 is an area for storing a set of verifier storing data. In this case, one of the set of verifier storing data is associated with each task processed by the task management system 200.

Hereinafter, verifier storing data associated with a specific task will be referred to as "verifier storing data of task A" or "verifier storing data of task B".

The verifier storing data contains partial verifier storing data linked together in a tree form. The partial verifier storing data is in a table form constituted of a set of lines. Each line has an address range section, a valid flag section, a chain flag section, and a verifier section.

In other words, the verifier storage area 223 stores a record which associates the predetermined address range in the task address space, a valid flag, a chain flag, and a task verifier with one another.

A value valid as an address range is stored in the address range section. A "true value" or a "false value" is stored in each of, the valid flag and chain flag sections. The task verifier is stored in the verifier section.

The partial verifier storing data are linked together based on the chain flag section and the address range section.

In other words, when the chain flag section of a specific line in the partial verifier storing data is a "true value", another partial verifier storing data is stored within an address range stored in the address range section of the specific line, and the partial verifier storing data is an element constituting the same verifier storing data.

The verifier storing data may contain only one partial verifier storing data. In such a case, the chain flag section of each line may be omitted.

Figure 7:
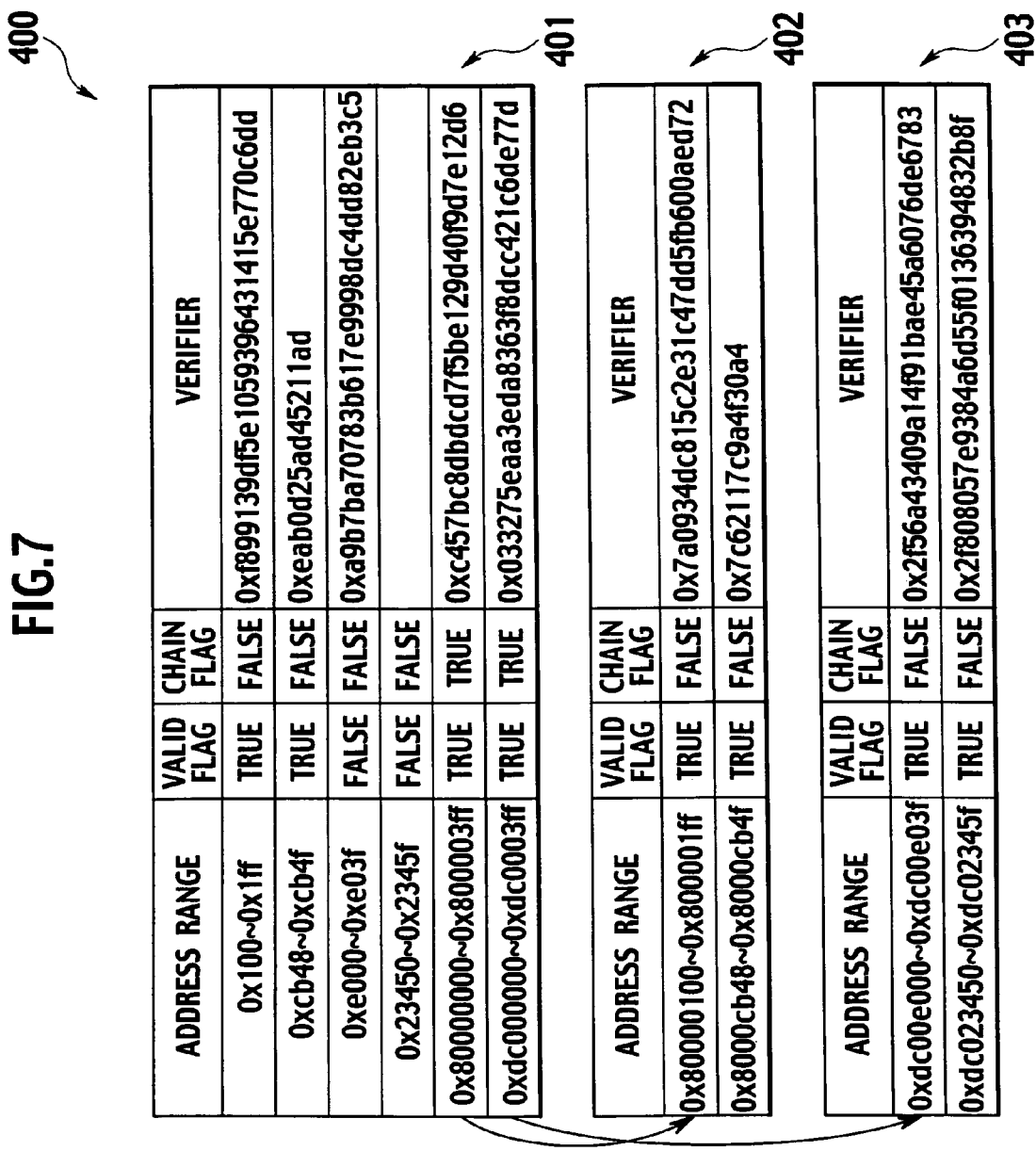
FIG. 7 is a table showing an example of management contents in a verifier storage area in the task management system of the first embodiment of the present invention.

Verifier storing data 400 shown in FIG. 7 is a specific example of verifier storing data, and contains partial verifier storing data 401 to 403. Here, the partial verifier storing data 402 and 403 are connected to the partial verifier storing data 401.

Specifically, the partial verifier storing data 402 is stored within an address range "0x80000000 to 0x800003ff", and the partial verifier storing data 403 is stored within an address range "0xdc000000 to 0xdc0003ff".

Hereinafter, a line of the partial verifier storing data constituting the verifier storing data may be referred to as a "line of verifier storing data" or "each line of verifier storing data" for convenience.

In the example of FIG. 6, the verifier storage area 223 is described separately from the task address spaces 122-1 to 122-n. However, the present invention is not limited to this example.

The invention can be applied to an example where a part or all parts of the verifier storage area 223 overlap the task address spaces 122-1 to 122-n.

In other words, the present invention can be applied to an embodiment in which verifier storing data regarding a task is stored in an address space of the task, or an embodiment in which partial verifier storing data alone constituting the verifier storing data of the task is stored in the task address space.

According to this embodiment, the management function 211, the verifier generating function 215, and the verifying function 216 constitute an execution standby state changer which generates a verifier of a task from data stored in the task address space and stores the generated verifier in the verifier storage area 223, when the task is changed from an executed state to an execution standby state.

Additionally, according to this embodiment, the management function 211, the verifier generating function 215, and the verifying function 216 constitute an executed state changer which generates a verifier of a task from data stored in the task address space, and verifies matching of the generated verifier with the verifier of the task stored in the verifier storage area 223, when the task is changed from an execution standby state to an executed state.

In this state, the execution standby state changer may be configured to update a verifier of a task in a record (line of verifier storing data) whose task verifier needs to be updated, and to store the updated verifier in the verifier storage area 223.

The execution standby state changer may be configured to judge that a record (line of verifier storing data) having a "false value" set in a valid flag is a record whose task verifier needs to be updated, and to update and store a task verifier of the task (line of verifier storing data) in the verifier storage area 223.

Furthermore, the execution standby state changer may be configured to judge that a record (line of verifier storing data) whose task verifier has not been updated for a predetermined period is a record (line of verifier storing data) whose task verifier needs to be updated, and to update and store a task verifier of the record (line of verifier storing data) in the verifier storage area 223.

(Operation of a Task Management System According to the First Embodiment of the Invention)

Hereinafter, referring to FIGS. 8 to 11, an operation of the task management system 200 of this embodiment will be described. Operations of the task interrupting function 112, the task resuming function 113, and the task switching function 114 are similar to those of the related art, and thus description thereof will be omitted.

First, referring to FIG. 8, description will be made of an operation carried out when the management function 211 of the task management system 200 performs task switching.

As shown in FIG. 8, in a step S101, when performing task switching, the management function 211 instructs the task interrupting function 112 to change a task which is currently in an executed state to an execution standby state. Hereinafter, the task which is currently in an executed state will be referred to as a "task A".

In a step S111, the management function 211 instructs the verifying function 216 to update a verifier of the task A.

In a step S102, the management function 211 instructs the task switching function 114 to select a task targeted for execution resumption, and to switch a task address space. Hereinafter, the task selected as the target of execution resumption will be referred to as a "task B".

In a step S112, the management function 211 instructs the verifying function 216 to verify the task B.

In a step S113, when the management function 211 receives a report of successful verification from the verifying function 216, the operation proceeds to a step S103. In other cases, the operation proceeds to a step S114.

In the step S103, the management function 211 instructs the task resuming function 113 to set the task B to an executed state, and finishes the operation.

On the other hand, in the step S114, the management function 211 executes processing of abnormality detection time, and finishes the operation.

Now, supplementary description will be made regarding the processing of the abnormality detection time of the step S114.

As the processing of the abnormality detection time, for example, one or a combination of processing of notifying an abnormality occurrence to a manger of the electronic computer, processing of recording the abnormality occurrence in an event log, processing of notifying the abnormality occurrence to the task B, processing similar to the step S103, and processing of finishing the task B is conceivable.

Second, referring to FIG. 9, description will be made of an operation when the verifying function 216 of the task management system 200 is instructed to update the task verifier by the management function 211.

As shown in FIG. 9, in a step S201, when instructed to update the task verifier by the management function 211, the verifying function 216 substitutes a task number of the designated task for a variable T.

In a step S202, the verifying function 216 accesses the verifier storage area 233 to check presence of a line whose verifier section needs to be updated in verifier storing data of the task of the task number "T".

Now, supplementary description will be made of criteria for lines whose verifier sections need to be updated in the step S202. There are a plurality of candidates as the criteria.

A first candidate is a criterion for regarding a line whose valid flag section is a "false value" as a line whose verifier section needs to be updated.

A second candidate is a criterion for regarding a line whose verifier section has not been updated for a predetermined period as a line whose verifier section needs to be updated. In this case, for example, the predetermined period is from the execution of the processing of the step S201 to the end of the operation.

If presence of such a line is determined in the step S203, the operation proceeds to a step S204. If such a line is not present, the operation is finished. Hereinafter, one such line will be referred to as a "line L".

In the step S204, the verifying function 216 substitutes a value of an address range section of the line L for a variable R.

In a step S205, the verifying function 216 designates an address range R to the verifier generating function 215, and instructs generation of a verifier.

In a step S206, the verifying function 216 stores a value of the verifier generated by the verifier generating function 215 in the verifier section of the line L, and a "true value" in a valid flag section of the line L. Then, the operation proceeds to the step S202.

Third, referring to FIG. 10, description will be made of an operation when the verifying function 216 of the task management system 200 is instructed to verify the task verifier by the management function 211.

As shown in FIG. 10, in a step S301, when instructed to update the task verifier by the management function 211, the verifying function 216 substitutes a task number of the designated task for a variable T.

In a step S302, the verifying function 216 accesses the verifier storage area 233 to check presence of a line needed to be verified in verifier storing data of the task of the task number "T".

Now, supplementary description will be made of criteria for lines needed to be verified in the step S302.

For example, one of the criteria is for regarding a line not verified for a predetermined period as a line needed to be verified. In this case, for example, the predetermined period is from the execution of the processing of the step S301 to the end of the operation.

If presence of such a line is determined in a step S303, the operation proceeds to a step S304. If such a line is not present, the operation proceeds to a step S307. Hereinafter, one such line will be referred to as a "line L".

In the step S304, the verifying function 216 verifies the line L. A specific example of the verification processing of the line L will be described later with reference to FIG. 11.

If the verification of the line L is successful in the step S305, the operation returns to the step S302. If the verification of the line L fails, the operation proceeds to the step S306.

In the step S306, the verifying function 216 reports the verification failure to the management function 211, and the operation is finished. On the other hand, in a step S307, the verifying function 216 reports the verification success to the management function 211, and the operation is finished.

Fourth, referring to FIG. 11, description will be made of an operation when the verifying function 216 of the task management system 200 verifies the task verifier of the designated line. The operation includes verification of the task verifier of the line L shown in the step S304 of FIG. 10.

As shown in FIG. 11, in a step S311, the verifying function 216 substitutes a designated line in the verifier storing data stored in the verifier storage area 223 for a variable L.

In a step S312, the verifying function 216 refers to a value of a valid flag section of the line L to judge whether the value of the valid flag section of the line L is a "true value" or not. In the case of a "true value", the operation proceeds to a step S313. In the case of a "false value", the operation proceeds to a step S318.

In the step S313, the verifying function 216 substitutes a value of an address range section of the line L for a variable R.

In a step S314, the verifying function 216 designates an address range R to the verifier generating function 215, and instructs generation of a task verifier.

In a step S315, the verifying function 216 compares the task verifier generated by the verifier generating function 215 with a value of a verifier section of the line L.

In a step S316, if both match each other, the operation proceeds to the step S318. In other cases, the operation processes to a step S317.

In the step S317, the verifying function 216 reports a verification failure to the management function 211, and the operation finishes the processing. On the other hand, in the step S318, the verifying function 216 reports a verification success to the management function 211, and the operation is finished.

(Operation/Effect of a Task Management System According to the First Embodiment of the Invention)

According to the task management system of this embodiment, the verifying function 216 collates the value of the verifier section of the line (verifier of task) in the verifier storing data generated and stored in the verifier storage area 223 when the executed state is changed to the execution standby state with the task verifier generated when the execution standby state is changed to the executed state, whereby it is possible to detect a change in the data stored in the task address space while the task is in the execution standby state.

Specifically, as shown in FIG. 8, when the processing of the abnormality detection time is executed in the step S114, it means that the management function 211 detects a change in the data stored in the task address space while the task is in the execution standby state.

Thus, according to the task management system 200 of this embodiment, a possibility is extremely small that illegal replacement of important data of other data by specific data, or a change freely made in the data stored in the storage unit 220 will be overlooked without being detected.

(Configuration of a Task Management System According to Second Embodiment of the Invention)

Figure 12:
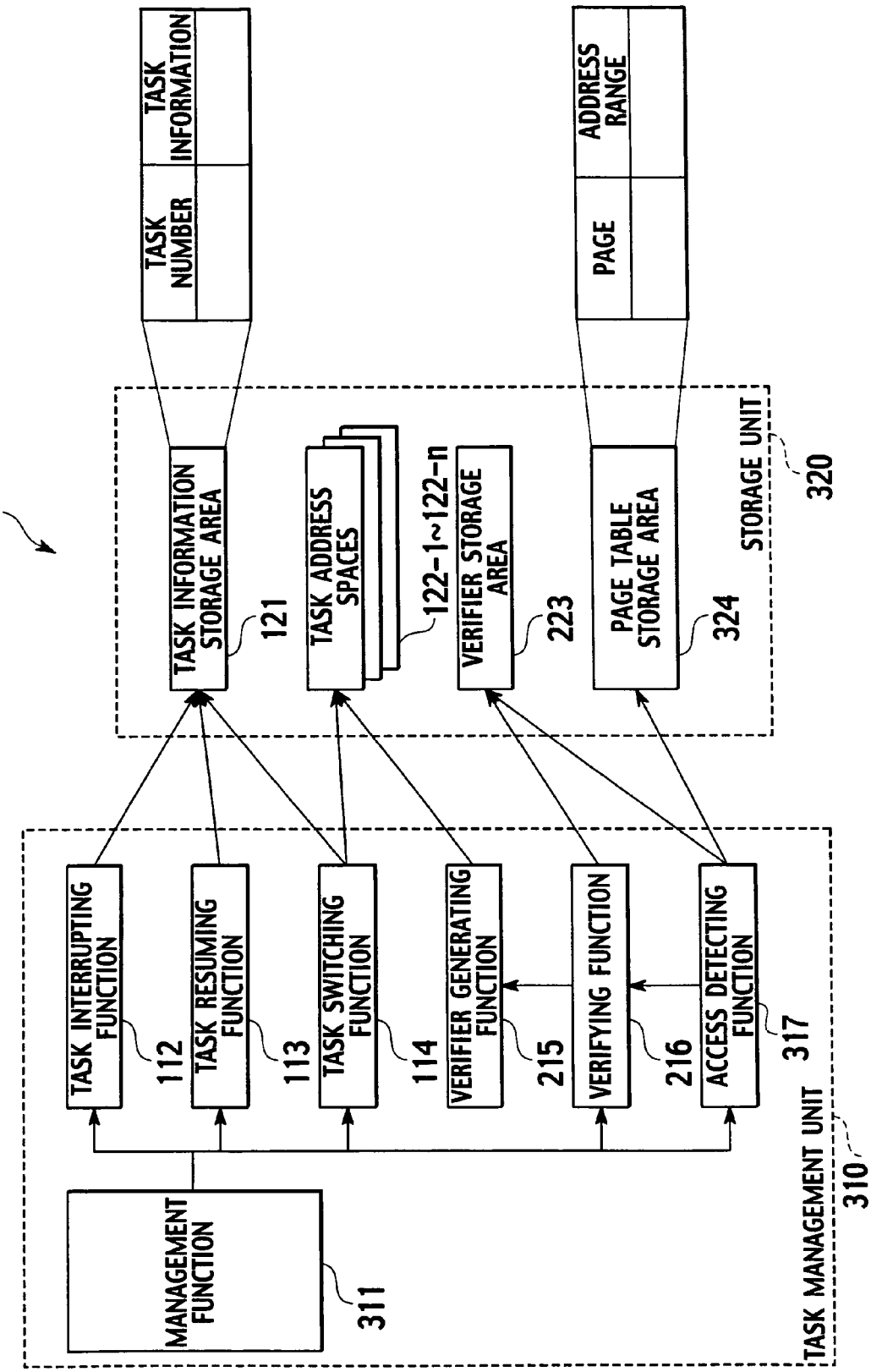
FIG. 12 is a functional block diagram of a task management system according to a second embodiment of the present invention.

Referring to FIG. 12, a task management system 300 of a second embodiment of the present invention will be described. Hereinafter, for the configuration of the task management system 300 of this embodiment, mainly differences from the task management system 200 of the first embodiment will be described.

As shown in FIG. 12, the task management system 300 of this embodiment includes a task management unit 310 and a storage unit 320.

The task management unit 310 includes a management function 311, a task interrupting function 112, a task resuming function 113, a task switching function 114, a verifier generating function 215, a verifying function 216, and an access detecting function 317.

The task interrupting function 112, the task resuming function 113, and the task switching function 114 are identical to the functions 112 to 114 of the task management system 100 of the related art.

The verifier generating function 215 and the verifying function 216 are identical to the functions 215 and 216 of the task management system 200 of the first embodiment.

The access detecting function 317 is configured to detect access to an address range of a verification target.

Specifically, the access detecting function 317 is configured to detect access to data stored in an address range (predetermined address range) set in an address range section of a specific record (line of detector storing data).

The access detecting function 317 may be configured to generate a page fault when it detects access to a page containing the predetermined address range of the specific record.

In this case, the verifier generating function 215, the verifying function 216, and the access detecting function 317 constitute a verifying unit for verifying, when a page fault occurs, a task verifier in the record containing a predetermined address range near an address in which the page fault has occurred.

The management function 311 is configured to control executions of the functions 112 to 317.

The storage unit 320 includes a task information storage area 121, a plurality of task address spaces 122-1 to 122-n, a verifier storage area 223, and a page table storage area 324.

The task information storage area 121 and the plurality of task address spaces 122-1 to 122-n are identical in configuration to the task information storage area 121 and the plurality of task address spaces 122-1 to 122-n of the task management system 100 of the related art.

The verifier storage area 223 is identical in configuration to the verifier storage area 223 of the task management system 200 of the first embodiment.

The page table storage area 324 is an area for storing a page table to manage a task address space by a paging system.

As shown in FIG. 12, the page table associates a page with an address range. The page table contains data general in an electronic computer equipped with a paging system virtual storage device, and thus detailed description will be omitted.

(Operation of a Task Management System According to the Second Embodiment of the Invention)

Hereinafter, referring to FIGS. 13 to 17, an operation of the task management system 300 of this embodiment will be described.

Operations of the task interrupting function 112, the task resuming function 113, and the task switching function 114 are similar to those of the related art, an operation of the verifying function 216 is similar to that of the first embodiment, and thus description thereof will be omitted.

First, referring to FIG. 13, description will be made of an operation carried out when the management function 311 of the task management system 300 performs task switching.

Figure 13:
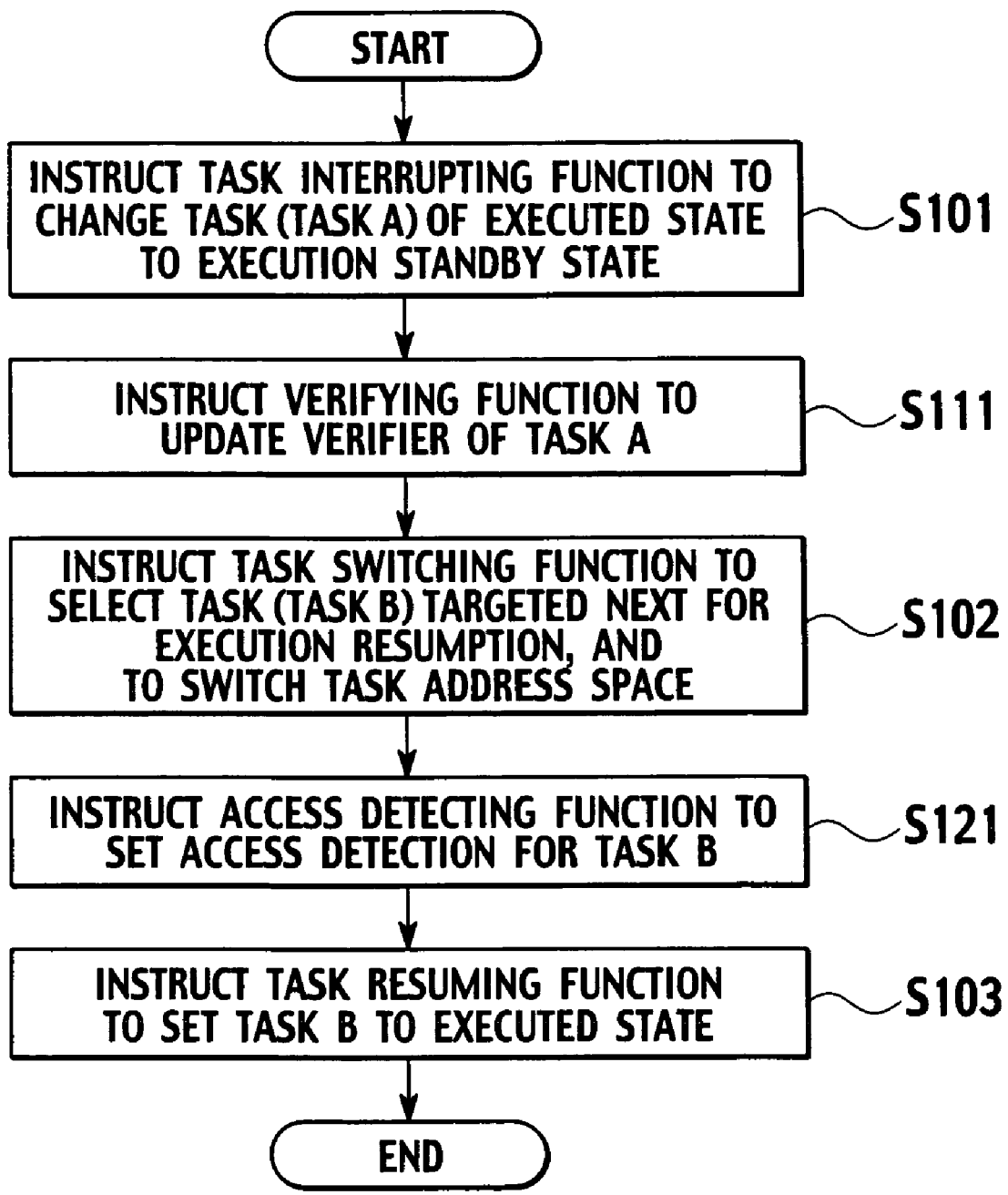
FIG. 13 is a flowchart showing an operation of a management function in the task management system of the second embodiment of the present invention.

As shown in FIG. 13, in a step S101, when performing task switching, the management function 311 instructs the task interrupting function 112 to change a task which is currently in an executed state to an execution standby state. Hereinafter, the task which is currently in the executed state will be referred to as a "task A".

In a step S111, the management function 311 instructs the verifying function 216 to update a verifier of the task A.

In a step S102, the management function 311 instructs the task switching function 114 to select a task targeted for execution resumption, and to switch a task address space. Hereinafter, the task selected as the target of execution resumption will be referred to as a "task B".

In a step S121, the management function 311 instructs the access detecting function 317 to set access detection for the task B.

In a step S113, the management function 311 instructs the task resuming function 113 to set the task B to an executed state, and the operation is finished.

Figure 14:
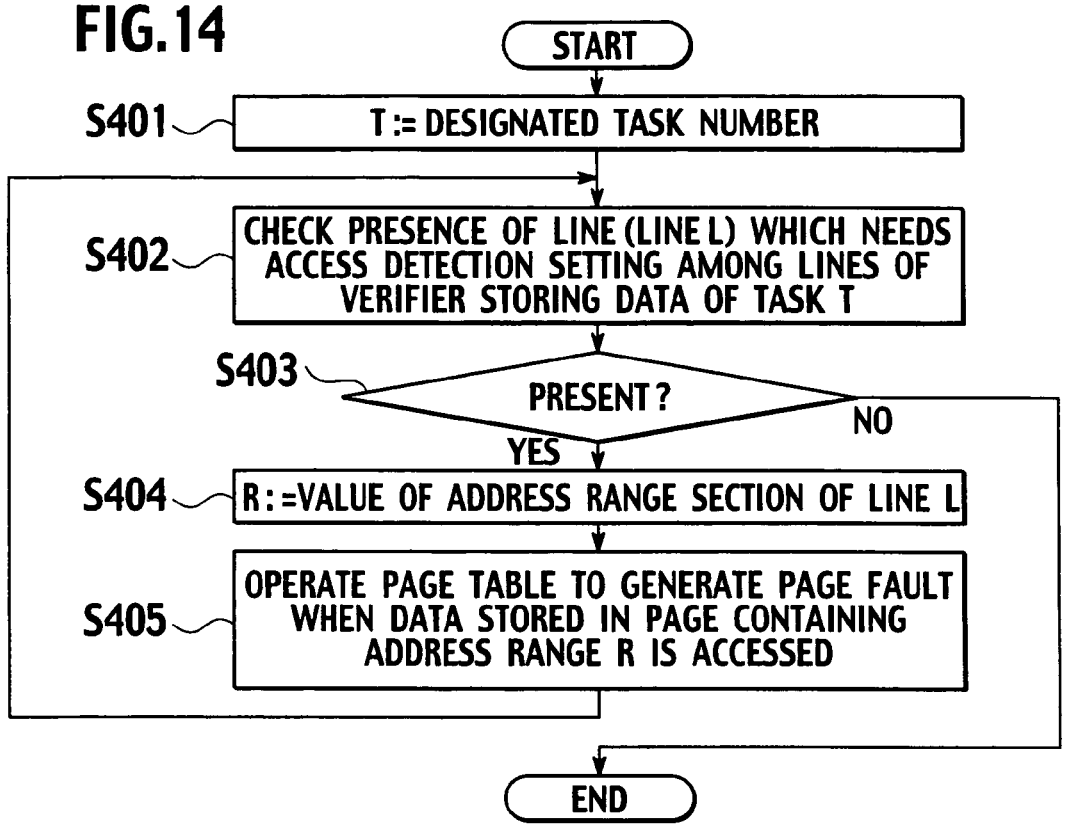
FIG. 14 is a flowchart showing an operation of an access detecting function in the task management system of the second embodiment of the present invention.

Second, referring to FIG. 14, description will be made of an operation when the access detecting function 317 of the task management system 300 is instructed to set access detection for the task by the management function 211.

In a step S401, when instructed to set access detection for the task by the management function 211, the access detecting function 317 substitutes a task number of the designated task for a variable T.

In a step S402, the access detecting function 317 checks presence of a line which needs access detection setting in verifier storing data of the task of the task number "T".

Now, supplementary description will be made of criteria for lines which need access detection setting in the step S402.

For example, one of the criteria is for regarding a line whose valid flag section value is a "true value" and which has not been targeted for processing of the step S04 for a predetermined period as a line which needs access detection setting. In this case, for example, the predetermined period is from the execution of the processing of the step S401 to the end of the operation.

If presence of such a line is determined in the step S403, the operation proceeds to the step S404. If such a line is not present, the operation is finished. Hereinafter, one such line will be referred to as a "line L".

In the step S404, the access detecting function 317 substitutes a value of an address range section of the line L for a variable R.

In a step S405, the access detecting function 317 operates the page table stored in the page table storage area 324 to set generation of a page fault when access to data stored in the page containing the address range R is detected.

Supplementary description will be made of a meaning of "page containing address range R" of the processing of the step S405.

In this case, "page containing address range R" means a page or pages completely contained in an address range designated as "R", and a page or pages containing addresses of end points of the address range designated as "R".

Figure 15:
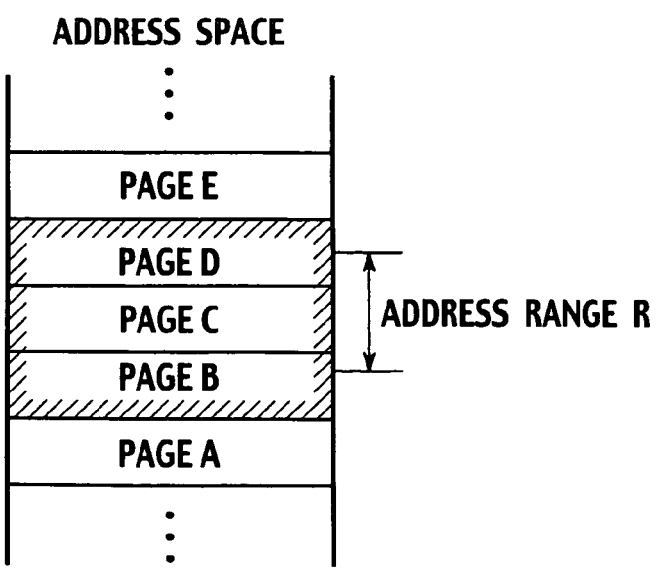
FIG. 15 is a diagram illustrating the operation of the access detecting function in the task management system according to the second embodiment of the present invention.

For example, if the address range R is a range shown in FIG. 15, "page containing address range R" is a page (page C) completely contained in the address range designated as "R" and pages (pages B and D) each containing address of each end point of the address range designated as "R", i.e., pages B, C and D.

As specific means for implementing processing of the step S405, by changing an entry of a page table for storing management data of a specific page, the specific page may be set to reading/writing inhibition, set so as not to correspond to a physical page (page frame), or the like.

Figure 16:
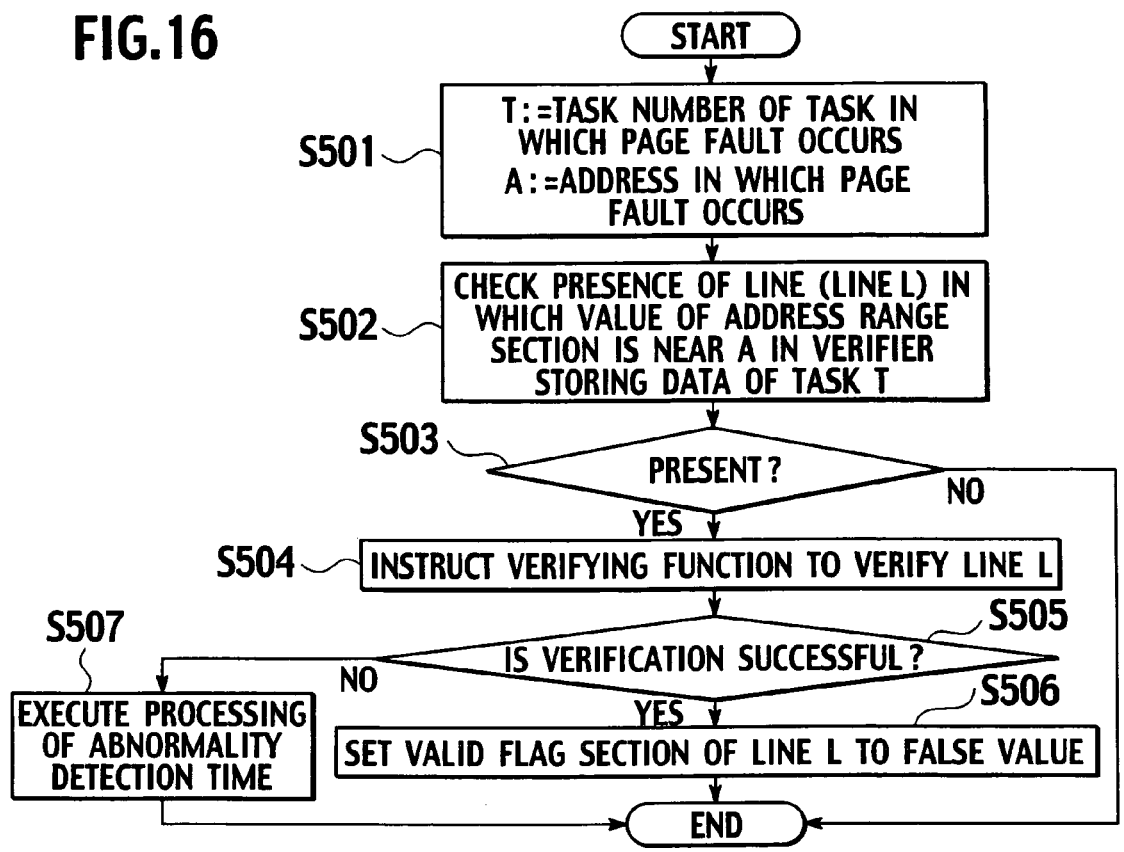
FIG. 16 is a flowchart showing an operation of the access detecting function in the task management system according to the second embodiment of the present invention.

Third, referring to FIG. 16, description will be made of an operation carried out by the access detecting function 317 of the task management system 300 when a page fault occurs.

In a step S501, the access detecting function 317 substitutes a task number of a task in which a page fault has occurred for a variable T, and an address of the page fault for a variable A.

In a step S502, the verifier storage area 223 is accessed to check presence of a line having a value of an address range section set near "A" in verifier storing data regarding the task of the task number "T".

Now, supplementary description will be made of the processing of the step S502. In the processing of the step S502, the following criteria are conceivable for judging whether the value of the address range section is near "A" or not.

Possible examples are a criterion (criterion C1) for judging that "value is near "A"" when the value of the address range section contains "A", a criterion (criterion C2) for judging that "value is near "A"" when a page containing the value of the address range section includes "A", a criterion (criterion C3) for judging that "value is near "A"" when a page range containing the value of the address range section or some pages before/after three page range contain "A", and the like.

Figure 17:
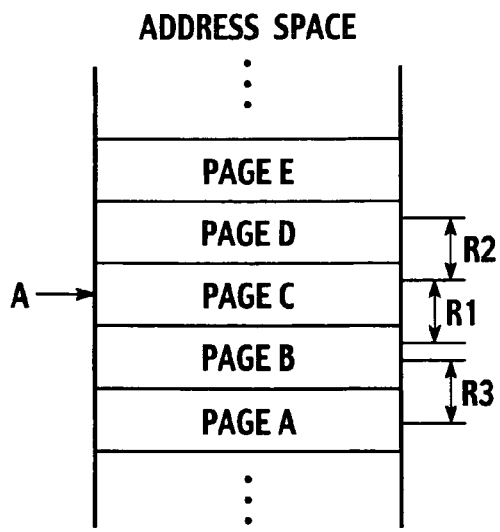
FIG. 17 is a diagram illustrating the operation of the access detecting function in the task management system of the second embodiment of the present invention.

For example, when "A" is a value shown in FIG. 17, an address range R1 alone is near "A" when the criterion C1 is employed, address ranges R1 and R2 are near "A" when the criterion C2 is employed, and address ranges R1 to R3 are near "A" when the criterion C3 is employed.

In a step S503, if the line is present, the operation proceeds to a step S504. If the line is not present, the operation is finished. Hereinafter, one such line will be referred to as "line L".

In the step S504, the access detecting function 317 instructs the verifying function 216 to verify the line L.

In a step S505, when the access detecting function 317 receives a report of verification success from the verifying function 216, the operation proceeds to a step S506. In other cases, the operation proceeds to a step S507.

In the step S506, the access detecting function 317 sets a value of a valid flag section of the line L to a "false value", and the operation is finished.

Processing of the step S506 is carried out to write a necessity of regeneration of a verifier of the task because of a possibility of a change in contents of the data caused by access to the data stored in the task address space, and to prevent a mistaken report of a verification failure when a page fault occurs again near the task address space after the data stored in the task address space is intentionally updated.

However, the processing of the step S506 is optional. In other words, in the step S505, when the access detecting function 317 receives the report of the verification failure from the verifying function 216, the operation may be finished without executing the step S506.

In the step S507, the access detecting function 317 executes processing of abnormality detection time, and the operation is finished. The processing of the abnormality detection time of the step S507 is similar to that of the step S114 executed when the management function 211 performs the task switching according to the first embodiment.

(Operation/Effect of Task Management System of the Second Embodiment of the Present Invention)

According to the task management system 300 of this embodiment, only when the access detecting function 317 detects an occurrence of access to the data stored in the task address space, the verifying function 216 verifies the task verifier.

When no access is executed to the data, the verification of the task verifier is omitted. Thus, it is possible to reduce a processing load to detect a change in the data stored in the task address space in the period of the execution standby state of the task.

According to the task management system 300 of this embodiment, even when a change actually occurs in the data, if the data is not accessed by a specific task, the change in the data may not be detected. However, no access by the task simultaneously means that the change in the data will not affect the processing of the task.

In other words, according to the task management system 300 of this embodiment, it is possible to detect only a change in data which will affect task processing.

Furthermore, according to the task management system 300 of this embodiment, the change in the data stored in the task address space in the period of the execution standby state of the task can be detected with a very high probability when the data is accessed by the task.

Thus, a possibility is very small that illegal rewriting of important data of the task or a change freely made in the data stored in the storage unit 320 will be overlooked without being detected to affect the processing of the task using the data.

As described above, according to the present invention, it is possible to provide the task management system capable of detecting a change to affect the processing of the task in the data stored in the task address space of the task.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A task management system in an operating system for executing a plurality of tasks in parallel, comprising:
   a processor including,
      an execution standby state changer configured to generate a first verifier of a task from data stored in a task address space and to store the generated first verifier in a verifier storage area when the task is changed from an executed state to an execution standby state;
      an executed state changer configured to change the task from the execution standby state to the executed state without a verification by using the first verifier of the task stored in the verifier storage area;
      an access detector configured to detect an access to data stored in a predetermined address range of a task address space of a verification target task which is changed to the executed state by the executed state changer; and
      a verifying unit configured to generate a second verifier of the verification target task from the data which is accessed and to verify matching of the second verifier with the first verifier of the task stored in the verifier storage area, only when access to the data of the verification target task is detected by the access detector; and
   a storage unit configured to store the task address space and the verifier storage area, wherein
   the verifier storage area is configured
      to store a record to associate a predetermined address range in the task address space with the first verifier of the task, and
      to store a record to associate the predetermined address range, the first verifier of the task, and a valid flag with one another, and
   the execution standby state changer is configured
      to update the first verifier of the task in a record in which the first verifier of the task needs to be updated, and to store the updated first verifier in the verifier storage area, and
      to judge that a record having a false value set in the valid flag is a record in which the first verifier of the task needs to be updated, to update the first verifier of the task in the record, and to store the updated first verifier in the verifier storage area.

2. The task management system according to claim 1, wherein the execution standby state changer and the executed state changer are configured to set, as a verifier of the task, data calculated by inputting the data stored in the task address space to a secure hash function or a reversible encoding function.

3. A task management system in an operating system for executing a plurality of tasks in parallel, comprising:
   a processor including,
      an execution standby state changer configured to generate a first verifier of a task from data stored in a task address space and to store the generated first verifier in a verifier storage area when the task is changed from an executed state to an execution standby state;
      an executed state changer configured to change the task from the execution standby state to the executed state without a verification by using the first verifier of the task stored in the verifier storage area;
      an access detector configured to detect an access to data stored in a predetermined address range of a task address space of a verification target task which is changed to the executed state by the executed state changer;
      a verifying unit configured to generate a second verifier of the verification target task from the data which is accessed and to verify matching of the second verifier with the first verifier of the task stored in the verifier storage area, only when access to the data of the verification target task is detected by the access detector; and
   a storage unit configured to store the task address space and the verifier storage area, wherein
   the verifier storage area is configured to store a record to associate a predetermined address range in the task address space with the first verifier of the task, and
   the execution standby state changer is configured to update the first verifier of the task in a record in which the first verifier of the task needs to be updated, and to store the updated first verifier in the verifier storage area, and to judge that a record having the first verifier of the task not updated for a predetermined period is a record in which the first verifier of the task needs to be updated, to update the first verifier of the task of the record, and to store the updated first verifier in the verifier storage area.

4. A task management system in an operating system for executing a plurality of tasks in parallel, comprising:

a processor including, an execution standby state changer configured to generate a first verifier of a task from data stored in a task address space and to store the generated first verifier in a verifier storage area when the task is changed from an executed state to an execution standby state;

an executed state changer configured to change the task from the execution standby state to the executed state without a verification by using the first verifier of the task stored in the verifier storage area;

an access detector configured to detect an access to data stored in a predetermined address range of a task address space of a verification target task which is changed to the executed state by the executed state changer;

a verifying unit configured to generate a second verifier of the verification target task from the data which is accessed and to verify matching of the second verifier with the first verifier of the task stored in the verifier storage area, only when access to the data of the verification target task is detected by the access detector; and a storage unit configured to store the task address space and the verifier storage area, wherein the verifier storage area is configured to store a record to associate a predetermined address range in the task address space with the first verifier of the task, the execution standby state changer is configured to update the first verifier of the task in a record in which the first verifier of the task needs to be updated, and to store the updated first verifier in the verifier storage area, and the execution standby state changer and the executed state changer are configured to set, as at least one of the first and the second verifiers of the task, data calculated by inputting the data stored in the task address space to a reversible encoding function, when the predetermined address range is smaller than a predetermined threshold value, and to set, as at least one of the first and the second verifiers of the task, data calculated by inputting the data stored in the task address space to a secure hash function, when the predetermined address range is larger than the threshold value.

5. A task management system in an operating system for executing a plurality of tasks in parallel, comprising:

a processor including, an execution standby state changer configured to generate a first verifier of a task from data stored in a task address space and to store the generated first verifier in a verifier storage area when the task is changed from an executed state to an execution standby state;

an executed state changer configured to change the task from the execution standby state to the executed state without a verification by using the first verifier of the task stored in the verifier storage area;

an access detector configured to detect an access to data stored in a predetermined address range of a task address space of a verification target task which is changed to the executed state by the executed state changer;

a verifying unit configured to generate a second verifier of the verification target task from the data which is accessed and to verify matching of the second verifier with the first verifier of the task stored in the verifier storage area, only when access to the data of the verification target task is detected by the access detector; and a storage unit configured to store the task address space and the verifier storage area, wherein the task address space is managed by a paging system, a page fault is generated when the access detector detects access to data stored in a page containing the predetermined address range of a specific record, and the verifying unit is configured to verify, when the page fault occurs, the verifier of the task in a record containing a predetermined address range near an address in which the page fault has occurred.

6. A task management method in an operating system for executing a plurality of tasks in parallel, comprising:

generating, in a processor, a first verifier of a task from data stored in a task address space and storing the generated first verifier in a verifier storage area when the task is changed from an executed state to an execution standby state;

changing, in the processor, the task from the execution standby state to the executed state without a verification by using the first verifier of the task stored in the verifier storage area;

detecting, in the processor, an access to data stored in a predetermined address range of a task address space of a verification target task which is changed to the executed state; and generating, in the processor, a second verifier of the verification target task from the data which is accessed and verifying matching of the second verifier with the first verifier of the task stored in the verifier storage area, only when access to the data of the verification target task is detected; and storing the first verifier in the verifier storage area, wherein the storing the first verifier in the verifier storage area includes, storing a record to associate a predetermined address range in the task address space with the first verifier of the task, updating the first verifier of the task in a record in which the first verifier of the task needs to be updated, storing the updated first verifier in the verifier storage area, storing a record to associate a predetermined address range, the first verifier of the task, and a valid flag with one another, judging, in the processor, that a record having a false value set in the valid flag is a record in which the first verifier of the task needs to be updated, updating the first verifier of the task in the record, and storing the updated first verifier in the verifier storage area.

7. The task management method according to claim 6, further comprising:

setting in the processor, as a first and/or second verifier of the task, data calculated by inputting the data stored in the task address space to a secure hash function or a reversible encoding function.

8. A task management method in an operating system for executing a plurality of tasks in parallel, comprising:
generating, in a processor, a first verifier of a task from data stored in a task address space and storing the generated first verifier in a verifier storage area when the task is changed from an executed state to an execution standby state;
changing, in the processor, the task from the execution standby state to the executed state without a verification by using the first verifier of the task stored in the verifier storage area;
detecting, in the processor, an access to data stored in a predetermined address range of a task address space of a verification target task which is changed to the executed state; and
generating, in the processor, a second verifier of the verification target task from the data which is accessed and verifying matching of the second verifier with the first verifier of the task stored in the verifier storage area, only when access to the data of the verification target task is detected; and
storing the first verifier in the verifier storage area, wherein the storing the first verifier in the verifier storage area includes,
storing a record to associate a predetermined address range in the task address space with the first verifier of the task,
updating the first verifier of the task in a record in which the first verifier of the task needs to be updated,
storing the updated first verifier in the verifier storage area,
judging, in the processor, that a record having the first verifier of the task not updated for a predetermined period is a record in which the first verifier of the task needs to be updated,
updating the first verifier of the task of the record, and
storing the updated first verifier in the verifier storage area.

9. A task management method in an operating system for executing a plurality of tasks in parallel, comprising:
generating, in a processor, a first verifier of a task from data stored in a task address space and storing the generated first verifier in a verifier storage area when the task is changed from an executed state to an execution standby state;
changing, in the processor, the task from the execution standby state to the executed state without a verification by using the first verifier of the task stored in the verifier storage area;
detecting, in the processor, an access to data stored in a predetermined address range of a task address space of a verification target task which is changed to the executed state; and
generating, in the processor, a second verifier of the verification target task from the data which is accessed and verifying matching of the second verifier with the first verifier of the task stored in the verifier storage area, only when access to the data of the verification target task is detected; and
storing the first verifier in the verifier storage area, wherein the storing the first verifier in the verifier storage area includes,
storing a record to associate a predetermined address range in the task address space with the first verifier of the task,
updating the first verifier of the task in a record in which the first verifier of the task needs to be updated,
storing the updated first verifier in the verifier storage area,
setting in the processor, as at least one of the first and the second verifiers of the task, data calculated by inputting the data stored in the task address space to a reversible encoding function when the predetermined address range is smaller than a predetermined threshold value, and
setting in the processor, as at least one of the first and the second verifiers of the task, data calculated by inputting the data stored in the task address space to a secure hash function when the predetermined address range is larger than the threshold value.

10. A task management method in an operating system for executing a plurality of tasks in parallel, comprising:
generating, in a processor, a first verifier of a task from data stored in a task address space and storing the generated first verifier in a verifier storage area when the task is changed from an executed state to an execution standby state;
changing, in the processor, the task from the execution standby state to the executed state without a verification by using the first verifier of the task stored in the verifier storage area;
detecting, in the processor, an access to data stored in a predetermined address range of a task address space of a verification target task which is changed to the executed state; and
generating, in the processor, a second verifier of the verification target task from the data which is accessed and verifying matching of the second verifier with the first verifier of the task stored in the verifier storage area, only when access to the data of the verification target task is detected;
managing the task address space by a paging system;
generating a page fault when the detecting access to data detects an access to data stored in a page containing the predetermined address range of a specific record; and
verifying, when the page fault is generated, the verifier of the task in a record containing a predetermined address range near an address in which the page fault has been generated.

* * * * *